United States Patent [19]

Hänle et al.

[11] Patent Number: 4,505,511
[45] Date of Patent: Mar. 19, 1985

[54] GASKET FOR WINDOW PANE

[75] Inventors: Edgar Hänle, Wettstetten; Joachim Wunderlich; Johann Zwickl, both of Ingolstadt; Stefan Haerdl, Gaimersheim, all of Fed. Rep. of Germany

[73] Assignee: Audi NSU Auto Union AG., Ingolstadt, Fed. Rep. of Germany

[21] Appl. No.: 506,326

[22] Filed: Jun. 21, 1983

[30] Foreign Application Priority Data

Jun. 22, 1982 [DE] Fed. Rep. of Germany ....... 3223155

[51] Int. Cl.³ .............................................. B60J 1/02
[52] U.S. Cl. ........................................ 296/93; 52/208
[58] Field of Search ................... 296/93; 52/208, 718; 49/490, 491

[56] References Cited

U.S. PATENT DOCUMENTS 3,705,470 12/1972 Kent ..................................... 52/208
4,037,017 7/1977 Griffin et al. .......................... 296/93

FOREIGN PATENT DOCUMENTS 1903732 10/1969 Fed. Rep. of Germany .
2120055 11/1971 Fed. Rep. of Germany .
2828262 1/1980 Fed. Rep. of Germany .
2935230 3/1981 Fed. Rep. of Germany .
3018213 11/1981 Fed. Rep. of Germany .
1230894 5/1971 United Kingdom .

Primary Examiner—Robert R. Song

[57] ABSTRACT

A gasket for use with window panes, such as windshields, fixedly mounted into a window opening of an automotive vehicle. The gasket is affixed to the margin of the window pane, and a base portion of the gasket is removably inserted into the gap formed between the edge of the pane and the surrounding wall portion of the window opening.

18 Claims, 4 Drawing Figures

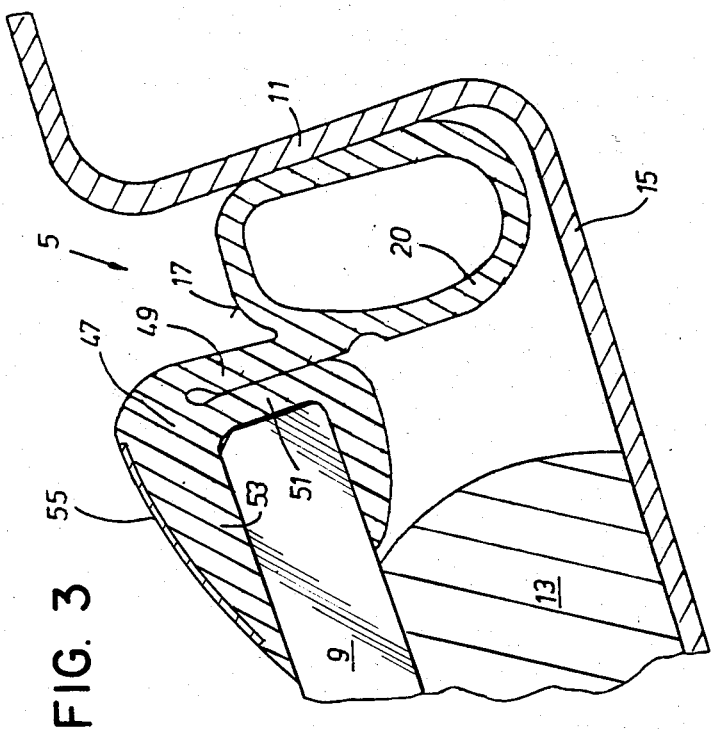
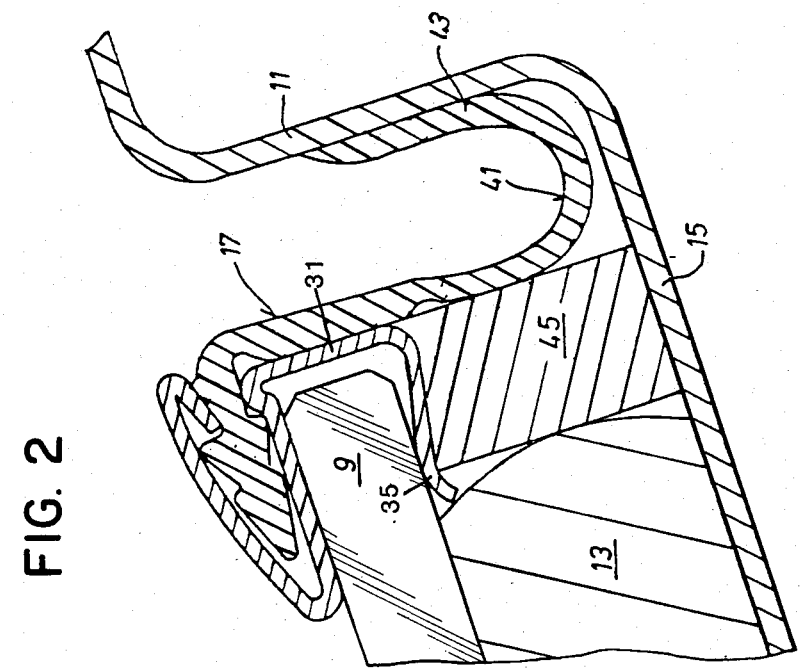

GASKET FOR WINDOW PANE

BACKGROUND OF THE INVENTION

The invention relates generally to a mounting arrangement for a fixed window pane in an automotive vehicle, and, more particularly, to a gasket of the kind used for closing the gap usually present between the edge of the pane and a wall portion of the surrounding window opening.

Conventionally, a window pane, such as a windshield, is adhesively affixed and sealed to a flange offset inwardly from a body panel of a vehicle. A wall portion extending generally normally between the flange and the body panel surrounds the edge of the pane in a more or less parallel relationship. A gap between the edge of the window pane and the wall portion is usually filled or covered by a gasket of pliable material, such as rubber or plastic. The gasket may be provided with extensions to form a smoothly contoured surface bridging the margins of the window pane and the body panel.

Arrangements of this general kind are shown in U.S. Pat. No. 4,035,017, U.K. Pat. No. 1,230,894, and European Patent Specification No. 0,029,391. In accordance with the disclosure of the U.S. Patent a gasket or molding of the kind in question is embedded in the adhesive securing the window pane to the body flange. Hence, the gasket cannot as a rule be removed without being damaged or destroyed. In the U.K. Patent a trim strip or gasket penetrating into and bridging the gap between the edge of the window pane and the surrounding body panel is provided with hook-shaped undercut parts which are forced into the adhesive, on assembly, before the termination of curing or vulcanizing of the adhesive. It will thus be appreciated that once the window has been assembled it cannot be removed, or its seal be repaired for possible leaks, without damage or destruction of the gasket. The European Specification discloses a generally V-shaped molding or gasket which is frictionally held between a window pane and a wall portion of the body panel surrounding the window opening. The attachment of the gasket may allegedly be improved be special integral lip members. However, neither the gasket by itself nor in combination with the lip member can provide a secure attachment of the gasket, particularly if because of unfavorable tolerances the gap between the edge of the window pane and the surrounding wall portion is either unduly wide or of irregular width.

Attempts have therefore been made to secure the gasket to the surrounding wall portion of the window opening. For this purpose bolts affixed to the wall portion are known to which the gasket is attached, usually by clips. This entails an unduly elaborate construction, and it adversely affects corrosion resistance. It also complicates removal of the window pane by a cutting wire.

SUMMARY OF THE INVENTION

It is thus an object of the invention to provide a gasket for a fixed automotive window pane which may be made and installed economically.

It is a further object of the invention to provide such a gasket which may be used for filling the gap between the edge of a window pane and the surrounding wall portion of a window opening notwithstanding variances in tolerances.

A still further object resides in the provision of a gasket which permits easy removal of a window pane with a cutting wire without attendant destruction of the gasket.

A special object of the invention is to provide a gasket which may be used repeatedly after removal from the gap as may be required for repairs to the window seal.

These and other objects are accomplished in accordance with the invention by a gasket for an automotive window pane adhesively affixed in sealing relationship to an attachment flange surrounding a window opening, whereby a base portion of a pliable gasket is removably penetrating into the gap between the edge of the window pane and the wall portion of the body panel and an extension of the gasket extends over the margin of the pane and is affixed thereto. Advantageously, the base portion of the gasket may be movable relative to the extension by about 180° in such a manner that with the extension attached to the pane the base portion may be removed from the gap between the edge of the pane and the wall portion of the surrounding window opening to render the gap accessible.

In an especially advantageous embodiment the base portion comprises an elongated molded tubular member attached to the extension by an intermediate flexible member.

Owing to the fact that the extension of the gasket is affixed to the margin of the window pane, the attachment of the base portion of the gasket in the gap is not detrimentally affected by unfavorable tolerances, i.e. irregularities in the width of the gap, for instance. By contrast to known window pane gaskets, the gasket in accordance with the invention may be preassembled with the window pane. This would not only prevent expensive delays in the mounting of the window into an automobile body but it would also reduce the possibility of injuries from handling the sharp edge of the pane during its mounting. Such preassembly of the gasket and the window pane, as contrasted with their assembly during mounting of the pane into the window opening, is of particular advantage in automated assembly operations. It also avoids the noise which may be generated in mounting conventional gaskets provided with metal decorative trims when the metal of the trim strikes the metal of the automobile body.

The fact that the base portion of the gasket may be moved out of the gap between the edge of the pane and the surrounding wall portion because the extension of the gasket is affixed to the margin of the pane, is of advantage where the seal between the window pane and the flange of the window opening requires repair; for with the base portion removed from the gap the seal would usually be accessible without removal of the pane. It would also be possible to perform additional painting operations, for instance in the area of the roof, without providing a masking around the gasket. Thus, the rim of paint or lacquer usually remaining after painting with a masking arrangement is avoided or moved into the gap where it would not be visible once the base portion of the gasket is reinserted into the gap. For purposes of such painting, the base portion would be rotated out of the gap by about 270° into overlying relationship with the window pane where it could be arrested temporarily by adhesive tape. In this manner the wall portion surrounding the edge of the pane could also be painted.

By contrast to arrangements in which the gasket is attached by bolts and clips to the wall portion of a window opening, the gasket in accordance with the invention permits easy removal of the adhesively secured window pane by means of a cutting wire as the space between the edge of the pane and the wall portion is wider by the length of the bolts otherwise present. Also, the gasket may, of course, be remounted with the window pane.

Advantageously the base portion of the gasket comprises a hollow tubular member connected to the extension by an intermediate member. The hollowness of the base portion assures sufficient elasticity even where large gaps are to be filled or concealed; it also allows deformation of the base portion in either direction during assembly and disassembly of the window. The intermediate member comprising a thin web-like part permits easy movement of the base portion relative to the extension.

In accordance with a further embodiment of the invention the externally visible surface of the base portion may be recessed within the gap, and thus provide for a drain. This would be aerodynamically advantageous as the gasket would not protrude beyond the adjacent surfaces even in case of large variances in tolerances or faulty installation. Such an arrangement makes the grooves optically appear to be even notwithstanding an irragularly placed gasket.

It has proven to be of particular advantage to use a molding with a U-shaped bracket for securing the gasket. The bracket would tensionally be attached to the margin of the window pane thus eliminating the need for adhesive to affix the extension of the gasket to the pane. By anchoring the bracket on the window pane rather than at the wall portion or inserting clips into the gap, corrosion resistance is increased.

It is especially advantageous to provide cut-outs in the opposite arms of the bracket so that the molding may easily be bent around corners, or shaped in any of the three dimensions. As the bracket may be a channel member extending the length of the molding, such cut-outs would prevent gaps between the molding and the window pane in case of unfavorable tolerances. In known arrangements, such gaps may cause wind noise and trap leaves and bristles and the like when washing the automobile in a machine.

Such a molding may be provided with a bent-over portion for receiving and retaining the extension of the gasket. This portion may be crimped to retain protrusions of the extension. The bent-over portion may itself serve as a garnish or decorative molding, thus obviating separate decorative strips and the resulting additional assembly steps.

Rather than using a molding provided with brackets for securing the gasket to the window pane, the extension of the gasket may be U-shaped to embrace top and bottom marginal portions of the window pane to which it may then be affixed directly by a suitable adhesive.

In a still different embodiment of the invention the extension and the base portion of the gasket may be separate elements.

In yet another embodiment the gasket may be provided with spacer members which may be interposed between the attachment flange of the window opening and the margin of the window pane so that the latter may be uniformly spaced from the flange.

Where it is desired to limit the spreading of the adhesive securing the window pane to the attachment flange, the gasket may be provided with an integral lip engaging the flange to prevent escape of the adhesive.

Other objects and further scope of applicability of the present invention will become apparent from the detailed description to follow, taken in conjunction with the accompanying drawings in which like parts are designated by like reference characters.

BRIEF DESCRIPTION OF THE DRAWINGS

FIGS. 2 through 4 show views similar to that of FIG. 1, but of different embodiments of gaskets in accordance with the invention.

DETAILED DESCRIPTION OF THE PREFERRED EMBODIMENTS

Figure 1:
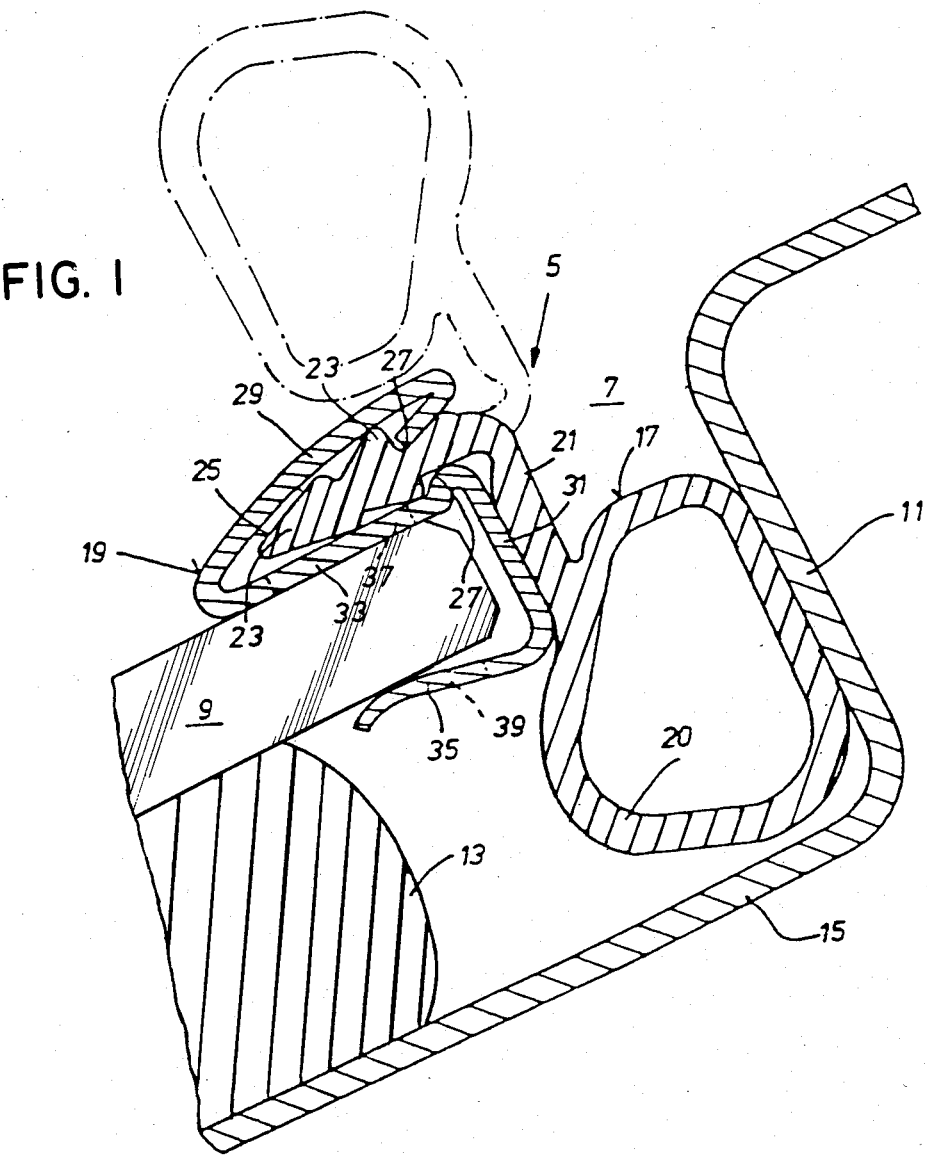
FIG. 1 is a cross-sectional view of a gasket in accordance with the invention, shown in position relative to a window pane adhesively affixed to a flange of a window opening of an automobile body.

FIG. 1 shows a window mounting arrangement 5 which is suited to cover or bridge a gap 7 between the edge of a window pane 9 and a wall portion 11 of a window opening surrounding the pane 9. The pane 9 is affixed to an attachment flange 15 by an adhesive 13 in a manner which is conventional. The adhesive, too, is conventional and is preferrably a curable material, such as a polysulfide base material including suitable fillers and solvents, and, when cured, exhibits the properties of rubber in that it will withstand shear stress, resist cracking and corroding under various climatic conditions. It also wets both glass and painted metal to assure a continuous bond between the attachment flange 15 and the window pane 9. The flange 15 extends from the wall portion 11 at a substantially right angle.

The window mounting arrangement 5 of FIG. 1 comprises a gasket 17 and a moulding 19 which serves to anchor the mounting arrangement 5.

A base portion 20 of the gasket 17 is formed as a tubular member and connected to it, extending outwardly, is a thin-walled intermediate member 21 which terminates in an extension 25 provided with protrusions 23. The protrusions 23 are held in position by a crimped portion 27 of a pocket-shaped or bent-over portion 29 of the molding 19. The base portion 20 of the gasket 17 is removable from the gap 7, in the manner shown in dotted lines, in order to provide unimpeded access to this space.

In addition to the bent-over pocket-like portion 29 the molding 19 is provided with a U-shaped bracket 31 which tensionally embraces the margin of the window pane 9. The opposite arms of the bracket 31 are provided with cut-outs such as 37 and 39, respectively, which are adapted easily to shape the molding 19 so that it may uninterruptedly follow the curved contour of the window pane 9.

Figure 4:
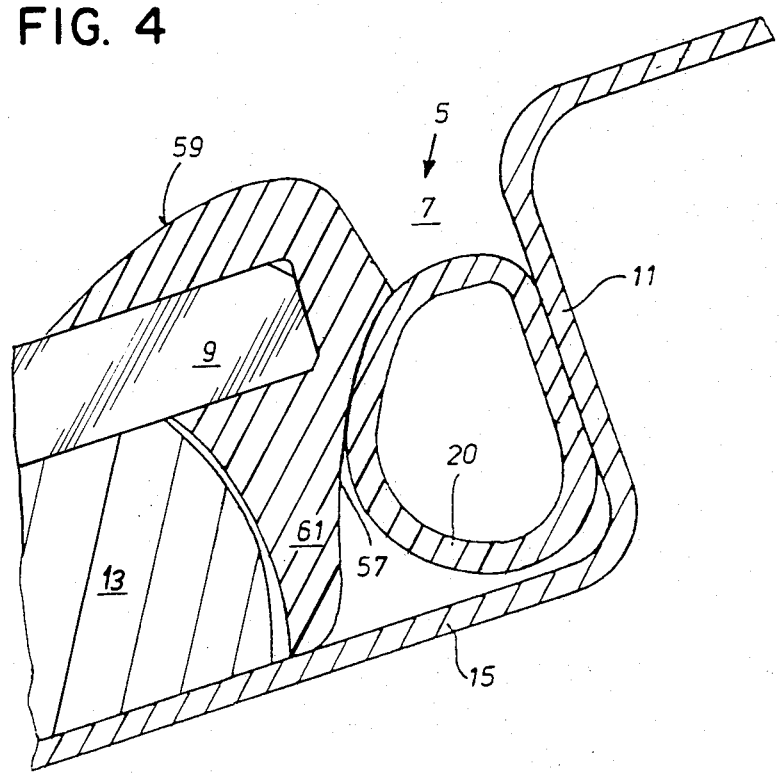

The embodiments of FIGS. 2 through 4 have been depicted in a manner similar to FIG. 1; like parts are thus identified by like reference numerals.

The window mounting arrangement of FIG. 2 differs from the one shown in FIG. 1 in that its base portion comprises a U-shaped member 41 rather than a tubular member. A free arm 43 of the member 41 enganges the wall portion 11 of the window opening. The embodiment also illustrates the manner in which the distance between the pane 9 and the attachment flange 15 may be kept constant by means of a spacer member 45. The spacer member 45 is advantageously attached to the arm 35 of the bracket 31, or it may be inserted between the pane 9 and the flange 15 as a separate element. As shown, its ends engage the arm 35 of the bracket 31 and the flange 15, respectively.

The embodiment shown in FIG. 3 differs from the previous embodiments in that no molding is used for affixing the gasket 17 to the window pane 9. Instead, a U-shaped member or extension 47 is integrally mounted on the gasket 17. The two arms of the extension 47 engage the upper and lower marginal surfaces of the pane 9, respectively, and my be secured thereto by a suitable adhesive. The extension 47 is connected to the base portion 20 of the gasket 17 by an intermediate member 49 which in the completed assembly engages the base portion 51 of the U-shaped extension 47. The arm 53 of the extension 47 which is externally visible may be provided with a decorative insert such as a metallic strip 55.

FIG. 4 depicts an embodiment of the invention in which the base portion 20 of the gasket 17 comprises a separate element inserted into the gap 7 between the edge of the window pane 9 and the wall portion 11 of the window opening. The base portion 20 comprises a tubular member retained in engagement with the wall portion 11 by a wedge-like member 57 of what may conveniently be termed a window frame 59 and which comprises another element of the gasket used in the window mounting arrangement of this embodiment. The frame 59 embraces the margin of the pane 9 and terminates in a downwardly directed lip 61. The lip 61 extends into engagement with the flange 15 and is thus adapted to limit spreading of the adhesive 13.

From the foregoing it will be appreciated that the present invention in any of the different embodiments depicted and described represents a very economical and improved window mounting arrangement; and while the invention has been described as having particular utility in the mounting of fixed windows in automotive vehicles, those skilled in the art will realize that it may be employed to equal advantage whereever windows are fixedly to be mounted in a sealing manner, and that it may be modified without departure from the concepts described in connection with the illustrated embodiments. Hence, it is to be understood that the foregoing description and the appended drawings are illustrative of preferred embodiments only, that they are not limiting, and that the scope of the present invention is to be determined by reference to the claims.

What is claimed is:

1. A gasket for use in an automotive vehicle body having a window opening defined by an attachment flange inwardly offset from an outer surface of the body by a wall portion and extending substantially parallel to the body surface, a window pane secured to the attachment flange and providing a gap of predetermined width between the edge of the window pane and the wall portion, the gasket comprising:
   a first elongated portion adapted to be affixed to a marginal portion of the window pane,
   a second elongated portion being transversally elastic and movable relative to the first elongated portion between a first position in which the second elongated portion is seated substantially entirely within the gap between the edge of the window pane and the wall portion and a second position in which it is out of the gap, whereby the gap is rendered accessible.

2. A gasket of claim 1, wherein the second portion comprises a hollow tubular member connected to the first portion by an intermediate member.

3. A gasket of claim 1, wherein the second portion comprises a U-shaped member the free end of which engages the wall portion when the second portion is in its first position.

4. The gasket of claim 1, wherein the second portion is mounted for pivotal movement relative to the first portion by at least about 180°.

5. The gasket of claim 1, wherein the second portion comprises an externally visible surface which when the second portion is in its first position is recessed relative to the adjacent surface of the body.

6. The gasket of claim 1, further comprising an elongated molding comprising a U-shaped channel member having a pair of rails adapted tensionally to engage marginal surface portions of the window pane.

7. The gasket of claim 6, wherein the rails are provided with cut-outs.

8. The gasket of claim 6, wherein the molding includes a bent-over portion for retaining the first portion of the gasket.

9. The gasket of claim 8, wherein the bent-over portion is provided with a crimp and the first portion of the gasket comprises protrusions adapted to be retained by the crimp.

10. The gasket of claim 1, wherein the first portion comprises a U-shaped member comprising a pair of arms adapted to embrace opposite marginal surface portions of the window pane.

11. The gasket of claim 10, wherein the first portion and the second portion comprise separate elements.

12. The gasket of claim 11, wherein the first portion comprises an inclined surface and the second portion, when in its first position, is retained between the inclined surface and the wall portion.

13. The gasket of claim 1, further comprising at least one spacer member positioned between the attachment flange and the overlying surface of the window pane for maintaining a constant distance therebetween.

14. The gasket of claim 1, wherein it is provided with a lip member extending into engagement with the attachment flange for limiting the spread of the adhesive by which the pane is affixed to the flange.

15. A gasket for use in an automotive vehicle body having a window opening defined by an attachment flange inwardly offset from an outer surface of the body by a wall portion and extending substantially parallel to the body surface, a window pane secured to the attachment flange and providing a gap of predetermined width between the edge of the window pane and the wall portion, the gasket comprising:
   a first elongated portion adapted to be affixed to a marginal portion of the window pane,
   a second elongated portion connected to the first elongated portion in substantially parallel relationship and having a transverse dimension adaptable to the width of the gap, and
   means for connecting the second portion to the first portion for pivotal movement relative thereto by at least about 180°, whereby the second portion is movable between a first position in which it is seated within the gap and a second position in which it is out of the gap to render it accessible.

16. The gasket of claim 15, wherein the second portion comprises a hollow tubular member.

17. The gasket of claim 16, wherein the connecting means comprises a flexible intermediate member between the first and second portions.

18. The gasket of claim 17, wherein the second portion, when in its first position, is seated substantially entirely within the gap.

* * * * *